United States Patent [19]
Falcone

[11] Patent Number: 6,162,521
[45] Date of Patent: Dec. 19, 2000

[54] FLUOROPOLYETHER AMIDE LUBRICANTS FOR AN INFORMATION STORAGE SYSTEM AND A METHOD OF MAKING THE SAME

[75] Inventor: Samuel John Falcone, San Jose, Calif.

[73] Assignee: Seagate Technology LLC, Scotts Valley, Calif.

[21] Appl. No.: 09/107,249

[22] Filed: Jun. 30, 1998

Related U.S. Application Data

[60] Provisional application No. 60/067,672, Dec. 5, 1997.

[51] Int. Cl.[7] .................................................. G11B 5/725

[52] U.S. Cl. .................. 428/65.4; 428/421; 428/694 TF; 428/900

[58] Field of Search ..................................... 428/65.8, 421, 428/694 TF, 900, 65.4

[56] References Cited

U.S. PATENT DOCUMENTS

| | | | |
|---|---|---|---|
| 4,085,137 | 4/1978 | Mitsch et al. | 260/561 HL |
| 5,000,864 | 3/1991 | Strepparola et al. | 252/51.5 R |
| 5,037,710 | 8/1991 | Frew et al. | 428/695 |
| 5,124,058 | 6/1992 | Corti et al. | 252/54 |
| 5,776,577 | 7/1998 | Yanagisawa | 428/65.4 |

*Primary Examiner*—Stevan A. Resan
*Attorney, Agent, or Firm*—Flehr Hohbach Test Albritton & Herbert LLP

[57] ABSTRACT

An information storage system and lubricant comprising a fluoropolyether amide lubricant on the surface of a storage medium is provided. In general, the lubricant of the present invention is comprised of amide derivatives of fluoropolyethers having at least one hydroxyl group, preferably amide derivatives of polyalkylene glycol (PEG) and fluorinated polyalkylene glycols, and most preferably amide derivatives of per fluorinated polyethylene glycols (PF-PEG).

12 Claims, 5 Drawing Sheets

FLUOROPOLYETHER AMIDE LUBRICANTS FOR AN INFORMATION STORAGE SYSTEM AND A METHOD OF MAKING THE SAME

RELATED APPLICATIONS

This application claims priority from provisional patent application Ser. No. 60/067,672 filed Dec. 5, 1997, the entire disclosure of which is incorporated herein by reference.

FIELD OF THE INVENTION

The field of this invention is lubricants for use in information storage systems. More particularly, the invention pertains to information storage systems employing a lubricant including fluoropolyether amides and a method of making such lubricants.

BACKGROUND OF THE INVENTION

In information storage systems, such as disc drives found in personal computers and other data processing devices, a magnetic storage medium is moved relative to a read/write head to provide information introduction to and/or retrieval from the magnetic storage medium. The magnetic storage medium (also referred to as a "disc" or "media") is typically comprised of a rigid substrate, an underlayer, a magnetic layer and a sputtered carbon layer atop the magnetic layer. In the design of such devices, it is most desirable from a magnetic standpoint to have the read/write head fly very close to the surface of the disc during movement to maximize the signal quality. Flying to low however, can cause wear and material interactions on the surface of the disc which lead to poor system reliability and performance. To reduce such wear and material interactions, a lubricant is commonly disposed on the surface of the disc.

Magnetic thin film discs typically require a barrier lubricant, which is generally applied on top of the sputtered carbon protective film, to reduce the wear of the interface between the read-write head and the disc during start stop cycles. The mechanical properties of the sputtered carbon film can be varied by incorporation of other elements during its preparation, such as hydrogen and nitrogen. Thus, the chemical interactions between the lubricant and the chemically modified carbon film are very important for the tribological properties of the carbon/lubricant system.

In particular, the lubricant should adhere strongly to the carbon film (represented by the bonded lube ratio), and should wet the film uniformly. Failure to wet the film uniformly could cause droplet formation and result in lubricant transfer to the read-write head during operation. In addition, if the lubricant is too volatile, it may transfer to the read-write head through the vapor phase. If enough lubricant is transferred to the head by these mechanisms, it could flood the head-disc interface when the drive is shut down, and the high value of static friction at the flooded interface could cause a drive failure (fly stiction). For the same reason, the lubricant should adhere strongly enough to the carbon film that it does not migrate and flood the head-disc interface during extended periods of operation. On the other hand, if the lubricant is so strongly bound that it does not replenish itself during drive operation, unacceptably high wear rates could result.

Further, the lubricant should by thermally and chemically stable, and exhibit the ability to resist decomposition over time, such as decomposition by acid catalysis. Conventional lubricants that contain formyl and difluoroformyl linkages in their backbone are subject to decomposition over time because the linkages are cleaved by acid catalysis. Thus, there is a continuing interest in the development of improved lubricants that exhibit good lubricating and tribological properties including wear resistance, low stiction, high bonded lube ratios and resistance to decomposition over time.

OBJECTS AND SUMMARY OF THE INVENTION

Accordingly, it is an object of the present invention to provide an information storage system employing a lubricant exhibiting desirable lubricating properties.

More particularly, it is an object of the present invention to provide a lubricant including fluoropolyether amides on the surface of a disc in an information storage system.

Another object of the present invention is to provide fluoro polyalkylene glycol amide lubricants on the surface of a disc in an information storage system.

Another object of the present invention is to provide a method of making a lubricant comprised of fluoropolyether amides.

These and other objects and advantages are achieved by the invention herein where an information storage system comprising a fluoropolyether amide lubricant on the surface of a storage medium is provided. In general the lubricant of the present invention is comprised of amide derivatives of fluoropolyethers having at least one hydroxyl group, preferably amide derivatives of polyalkylene glycol (PEG) and fluorinated polyalkylene glycols, and most preferably amide derivatives of perfluorinated polyethylene glycols (PF-PEG).

In one embodiment of the subject invention, the lubricant includes a fluoropolyether amide having the general formula of:

$$AO(R1O)_X(R2O)_Y(R3O)_ZA$$

where:

R1 is selected from the group consisting of fluoroalkyls having two to ten carbon atoms and perfluoralkyls having two to ten carbon atoms;

R2 and R3 comprise at least two carbon atoms and are independently selected from the group consisting of alkyl, substituted alkyl, fluoroalkyl, perfluoroalkyl, aryl, substituted aryl, fluoroaryl and perfluroaryl groups;

A is $CF_2CONR4R5$ x is in the range of approximately 5 to 500;

y and z are independently in the range of 0 to approximately 100;

R4 and R5 are independently selected from the group consisting of alkyls substituted alkyls, aromatics, substituted aromatics, branched and/or unsaturated, and any of the above structures that also contain silanes, sulfur, phosphorous or alcohol residues.

The fluoropolyether amides may be completely or partially fluorinated, and may be linear or branched.

In another embodiment of the present invention, a method of making fluoropolyether amide lubricant is provided. The method comprises the steps of: providing a perfluoro polyether ester; reacting said polyether ester with an amine; and forming said lubricant comprised of a perfluoro polyether amide.

BRIEF DESCRIPTION OF THE FIGURES

Additional objects and features of the present invention will become apparent upon reading of the detailed description of the invention and the appended claims provided below, and upon reference to the drawings in which:

DESCRIPTION OF THE SPECIFIC EMBODIMENTS

An information storage system having a lubricant on the surface of a storage medium (or disc) is provided. The lubricant includes a fluoropolyether amide. In general, the inventive lubricant is comprised of amide derivatives of fluoropolyethers having at least one hydroxyl group. Preferably, the amides are derivatives of polyalkylene glycol and fluorinated polyalkylene glycols, and most preferably amide derivatives of perfluorinated polyethylene glycols (PF-PEG). The inventor has discovered that during the synthesis of fluoropolyethers, particularly fluorinated polyethylene glycols, an ester or diester intermediate is formed which serves as a very useful synthon for preparing a wide variety of amides that are useful as lubricants. Wide organic structural variety is possible using this synthetic method of the present invention, and many amide derivatives of fluorinated polyether s can be prepared according to the present invention. Each of such derivatives can be analyzed to determine the chemical structure verses lubricant property relationships of the amide compounds.

In general, the lubricant of the present invention is comprised of amide derivatives of fluoropolyethers, preferably amide derivatives of polyalkylene glycol (PEG) and fluorinated polyalkylene glycols, and most preferably amide derivatives of perfluorinated polyethylene glycols (PF-PEG).

In one embodiment of the subject invention, the lubricant includes a fluoropolyether amide having the general formula of:

$$AO(R1O)_x(R2O)_y(R3O)_zA$$

where:
R1 is selected from the group consisting of fluoroalkyls having two to ten carbon atoms and perfluoralkyls having two to ten carbon atoms;
R2 and R3 comprise at least two carbon atoms and are independently selected from the group consisting of alkyl, substituted alkyl, fluoroalkyl, perfluoroalkyl, aryl, substituted aryl, fluoroaryl and perfluroaryl groups;
A is $CF_2CONR4R5$;
x is in the range of approximately 5 to 500;
y and z are independently in the range of 0 to approximately 100; and
R4 and R5 are independently selected from the group consisting of alkyls substituted alkyls, aromatics, substituted aromatics, branched and/or unsaturated, and any of the above structures that also contain silanes, sulfur, phosphorous or alcohol residues.

In the fluoropolyether amide lubricants of the present invention, n is selected such that the amide lubricants have an average molecular weight in the range of approximately 1000 to 10,000; preferably in the range of approximately 1500 to 5000.

The fluoropolyether amides may be completely or partially fluorinated, and may be linear or branched. The fluoropolyether amides include homopolymers, copolymers and random polymers, wherein different repeating units may be distributed along the backbone of the polymer.

In another embodiment of the present invention the fluoropolyether amide is comprised of a fluoro polyalkylene glycol amide. Preferably, the lubricant of the present invention is comprised of amide derivatives of fluorinated polyethylene glycols, with amide derivatives of perfluorinated polyethylene glycols (PF-PEG) being most preferred. In one embodiment of the subject invention, the lubricant includes a perfluoro polyalkylene glycol amide having the general formula of:

$$A-CF_2(OR1)_nOCF_2A$$

where:
R1 comprises at least two carbon atoms and are independently selected from the group consisting of alkyl, substituted alkyl, fluoroalkyl, perfluoroalkyl, aryl, substituted aryl, fluoroaryl and perfluroaryl groups; and preferably R1 is selected from the group consisting of fluoroalkyls having two to ten carbon atoms and perfluoralkyls having two to ten carbon atoms;
A is $CF_2CONR4R5$, and R4 and R5 are as defined above; and
n is selected such that the amide lubricant has an average molecular weight in the range of approximately 1000 to 10,00; preferably in the range of approximately 1500 to 5000.

The fluoro polyethylene glycol amides may be completely or partially fluorinated, and may be linear or branched.

In a preferred embodiment, the lubricant of the present invention is comprised of perfluoro polyethylene glycol amide having the following formula:

$$A-CF_2(OCF_2CF_2)OCF_2A$$

where:
A is $CF_2CONR4R5$, and R4 and R5 are as defined above; and
n is selected such that the total molecular weight of the polymer is in the range of approximately 1000 to 10,000, and preferably is in the range of approximately 1500 to 5000. The fluoro polyethylene glycol amides may be completely or partially fluorinated, and may be linear or branched. In a preferred embodiment, the amide is perfluoro polyethylene glycol gerinal amide.

The lubricant of the present invention comprising a fluoropolyether amide will generally be provided in solution with a solvent. The term "solvent" means a solvent in which the fluoropolyether amide is soluble, such as fluorinated organic solvents. For example, the lubricant may be dissolved in a conventional hydrocarbon solvent such as PE-5060, Vertrel-XF or AK-225. The concentration of the polymer in the solvent will be in the range of 0.01 to 1.0 wt % amide, and preferably in the range of 0.03 to 0.1 wt % amide.

Figure 1A:
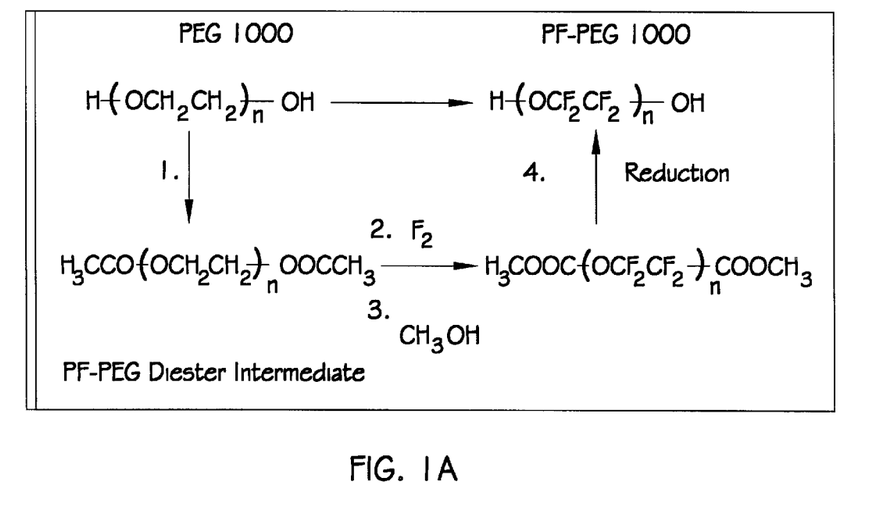
FIGS. 1A and 1B illustrate synthesis reactions of a fluoropolyether ester (in this case a perfluoro polyethylene glycol ester "PF-PEG") which is used to form the lubricant in accordance with one embodiment of the present invention.

In an alternative embodiment, a method of making the fluoropolyether amide is provided. In general, the method comprising the steps of: providing a perfluoro polyether ester or diester; reacting the perfluoro polyether ester or diester with an amine; and forming the lubricant comprised of a perfluoro polyether amide. Specifically, the present invention provides for the synthesis of amides using the reaction mechanisms shown by FIGS. 1A, 1B and 1C. FIG. 1A illustrates one example of a synthesis reaction wherein perfluoro polyethylene glycol (PF-PEG) is the precursor. Of particular importance, a diester intermediate is formed. The diester intermediate is formed by reacting the glycol with a carboxylic acid to form a fluoro polyethylene glycol ester or diester. The diester is prepared according to the reaction in FIG. 1 and is more fully described in pending application Ser. No. 09/055,265 which is hereby incorporated herein by reference in its entirety. While one example is shown, it will be understood by those of ordinary skill in the art that any fluoropolyether ester or fluoro polyalkylene glycol ester may employed in the practice of the present invention. Accordingly, the ester may be of the formula:

where:

R1 is selected from the group consisting of fluoroalkyls having two to ten carbon atoms and perfluoralkyls having two to ten carbon atoms;

R2 and R3 comprise at least two carbon atoms and are independently selected from the group consisting of alkyl, substituted alkyl, fluoroalkyl, perfluoroalkyl, aryl, substituted aryl, fluoroaryl and perfluroaryl groups;

x is in the range of approximately 5 to 500;

y and z are independently in the range of 0 to approximately 100 and

B is $CF_2COOCH_3$.

Examples of suitable esters of the present invention include, but are not limited to, polyethylene glycol ester, polypropylene glycol ester, polybutylene glycol ester, polytetrahydrofuran ester, or polyepichlorohydrin ester, and their diesters.

Figure 1B:
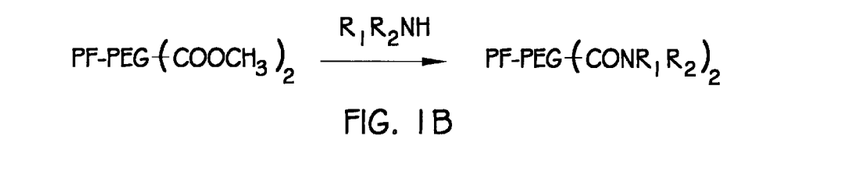
Figure 1C:
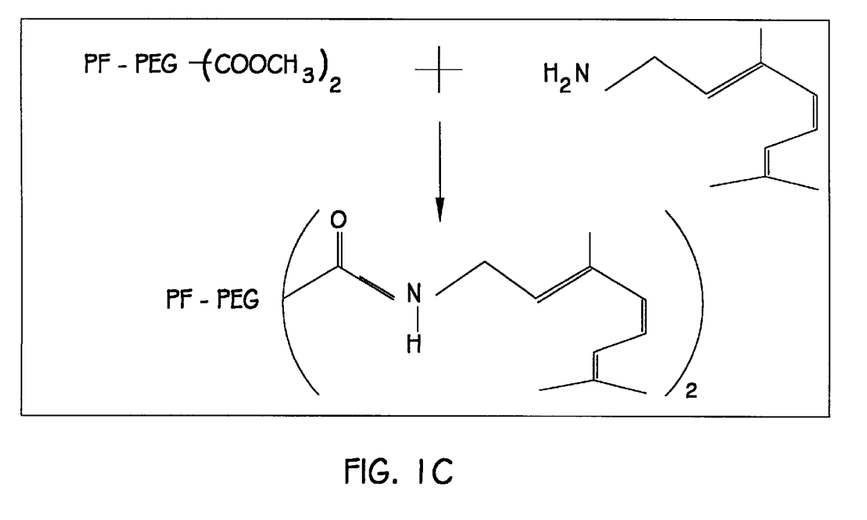
FIG. 1C illustrate the synthesis reactions of a fluoropolyether amide in accordance with one embodiment of the present invention.

Of particular advantage according to the present invention, the polyether ester or diester intermediate is then reacted with an amine to form a large variety of amide derivatives as shown in FIG. 1B. The amide derivatives are the lubricants of the present invention. The polyether ester or diester (a fluoro polyethylene diester as shown in FIGS. 1A and 1B) is reacted with an amine to form the amide lubricant of the present invention. Suitable amines are of the general formula:

R4R5NH where R4 and R5 are independently selected from the group consisting of: alkyl groups having from 1 to 18 carbons, substituted alkyls, aromatics, substituted aromatics, branched and/or unsaturated, and any of the above structures that also contain silanes, sulfur, phosphorous or alcohol residues. The amines may be primary or secondary amines. Amines finding use in the present invention include peperonyl amine, oleyl amine and gerinal amine, with oleyl and gerinal amines being preferred. An exemplary reaction is depicted in FIG. 1C, wherein a perfluoro polyethylene glycol diester is reacted with a gerinal amine to form a perfluoro polyethylene glycol gerinal amide. The amides of the present invention may be purified by liquid chromatometry or super critical fluid extraction.

Of particular advantage, many amide derivatives may be formed by the method of the present invention. These derivatives may then be tested to determine their lubricant properties. Suitable fluoropolyether amide lubricants according to the invention include but are not limited to: perfluoro polyethylene glycol piperonyl amide, perfluoro polyethylene glycol gerinal amide, perfluoro polyethylene glycol oleyl amide and 3-trimethoxysilyl amide.

Figure 2:
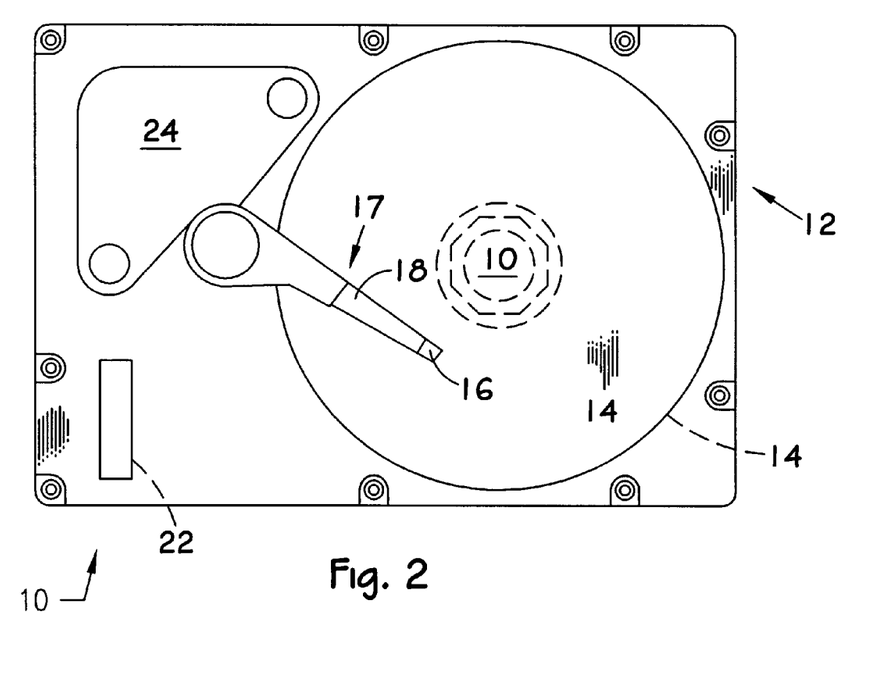
FIG. 2 shows a disc in an information storage system having a lubricant on the surface of the disc in accordance with the present invention.

The lubricant of the present invention are disposed on the surface of a disc in an information storage system. The information storage system will comprise at least a head-disc assembly and control electronics which may be employed with a computer, printer or fax machine or other host system. Many different information storage system configurations are known in the art. A simplified drawing of an exemplary information storage system is shown in FIG. 2. As shown in FIG. 2 the information storage system 10 includes a sealed housing 12, a magnetic storage medium 14 which is usually in the form of a disc, a read/write head 16, and an actuator assembly 17 having an actuator arm 18 for positioning the read/write head 16 disposed at the end of the actuator arm 18 over the surface of the storage medium 14. Multiple read/write heads may be employed although not shown in the plan view. The read/write head 16 carries a read/write element (not shown), and the element can be any type known in the art, such as inductive thin film, MIG or MR. A spindle motor 10 is provided which mounts the disc or discs 14 and spins them at a constant speed. A header assembly 22 is provided for transferring electronic signals to and from a motor 24 which positions the actuator and the read/write head 16 as data is transferred to and from the disc 14.

Generally, the surface of the disc 14 will be textured. The entire surface of the disc may be textured to minimize stiction, friction, and wear during start-stop cycles. Alternatively, separate textured data and landing zones may be provided on the surface of the disc. The lubricant disposed on the surface of the disc 14 and acts to minimize wear, friction and stiction between the disc and the read/write head as the read/write head passes over the disc. Of particular advantage, the fluoropolyether amide of the present invention provides an improved lubricant. The fluoropolyether amide is disposed on the surface of the disc 14 by conventional means such as dip coating or spin-on coating. To provide desirable lubricating properties, the thickness of the fluoropolyether amide disposed on the surface of the disc is in the range of 10 Å to 50 Å, and preferably is in the range of 20 Å to 40 Å.

The fluoropolyether amide is thermally stable and the lubricating properties of the fluoropolyether amide are useful over the temperature range of operation of the information storage system, i.e. from approximately 10° C. to 80° C.

EXPERIMENTAL

The following tests demonstrate the capabilities of the present invention and such examples are offered by way of illustration and not by way of limitation.

EXAMPLE 1

Figure 3:
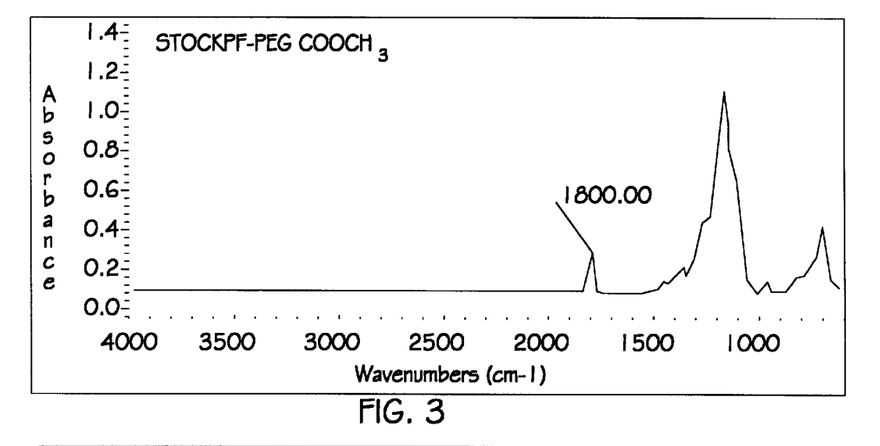
FIG. 3 is a FTIR plot for a PF-PEG diester of the present invention.
Figure 4:
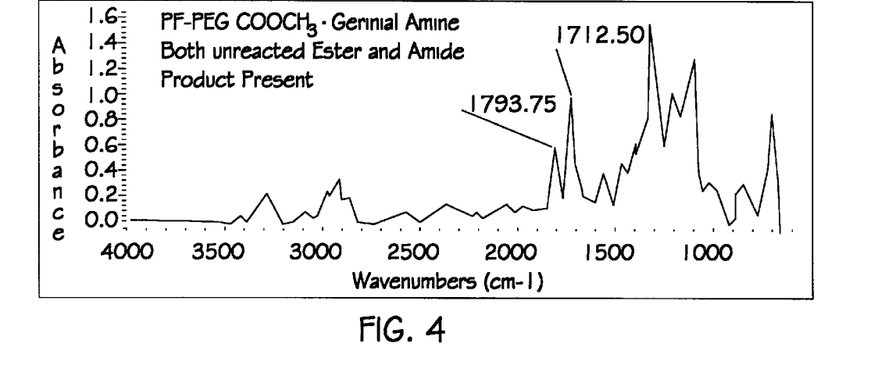
FIG. 4 is a FTIR plot of PF-PEG diester and gerinal amine components during the synthesis of the lubricant in one embodiment of the present invention.
Figure 5:
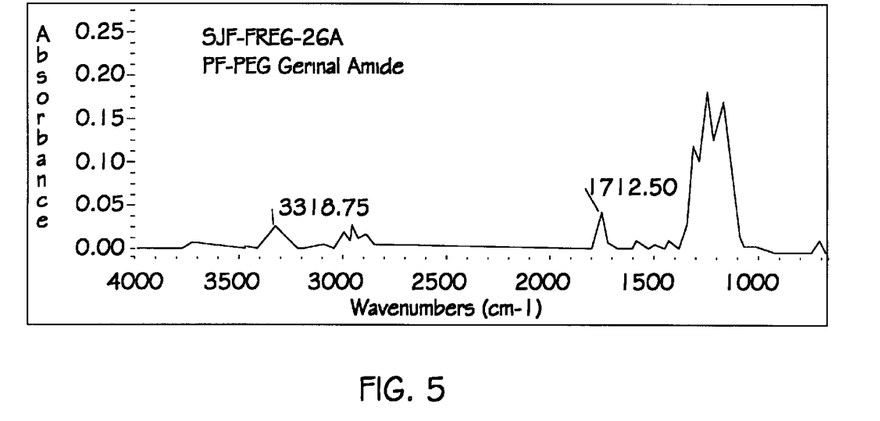
FIG. 5 is a FTIR plot of the lubricant product according to one embodiment of the present invention.
Figure 6A:
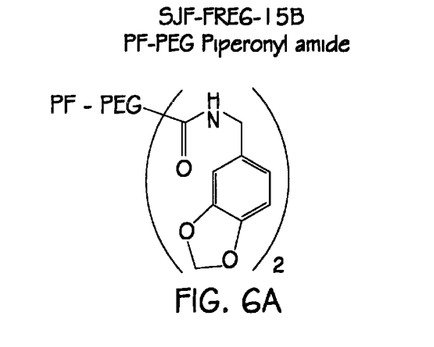
FIGS. 6A and 6B illustrate the chemical structure of two exemplary fluoropolyether amides according to two embodiments of the present invention.
Figure 6B:
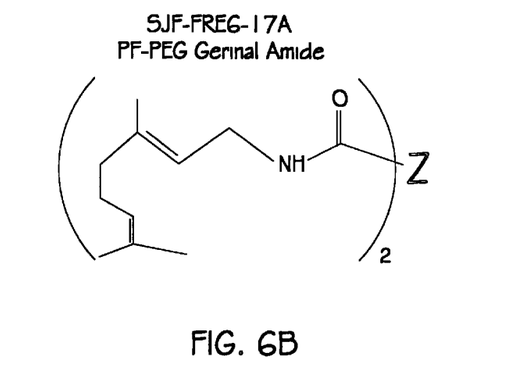
Figure 7:
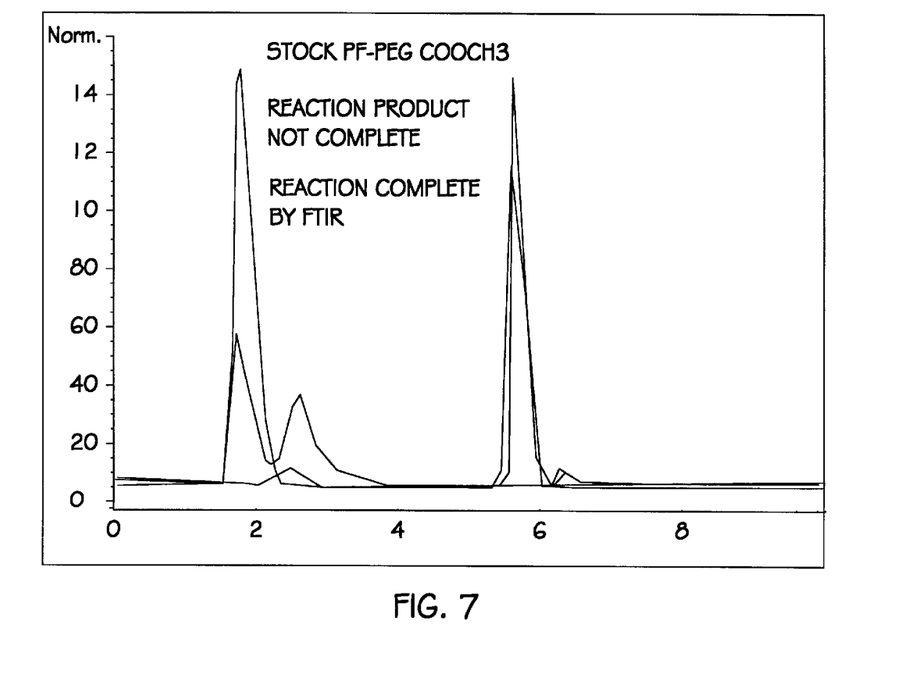
FIG. 7 is a high performance liquid chromatography (HPLC) graph showing the purity of the synthesis of the fluoropolyether amide of the present invention.

In a 20 ml scintillation vial were added 2.85 g (0.713 mm) of perfluoro polyethylene glycol diester and approximately 5 ml of HFE. The diester is prepared according to the reaction in FIG. 1 and as described in pending application Ser. No. 09/055,265. This solution was then titrated with Gerinal amine until the ester carbonyl was gone as evidenced by FTIR plots. During the reaction, FTIR plots were taken as shown in FIGS. 3 and 4. FIG. 3 shows the FTIR plot for the diester prior to reaction. FIG. 4 shows a FTIR plot for the diester and Gerinal amine components during the synthesis of a lubricant according to the present invention. The reaction mixture was then stirred for approximately three days at room temperature. At this time the reaction mixture was poured onto approximately 50 mls of 10% HCL and the aqueous layer thoroughly extracted with HFE. The HFE extracts were combined, washed once with water, dried over $Na_2SO_4$, and evaporated in vacuo to yield 3.0 g (99.2%) of an amber oil. The FTIR plot of this amide lubricant is shown in FIG. 5. The chemical structure of two exemplary fluoropolyether amides are shown in FIGS. 6A and 6B. The HPLC plot of the reaction product is shown in FIG. 7.

EXAMPLE 2

Figure 8:
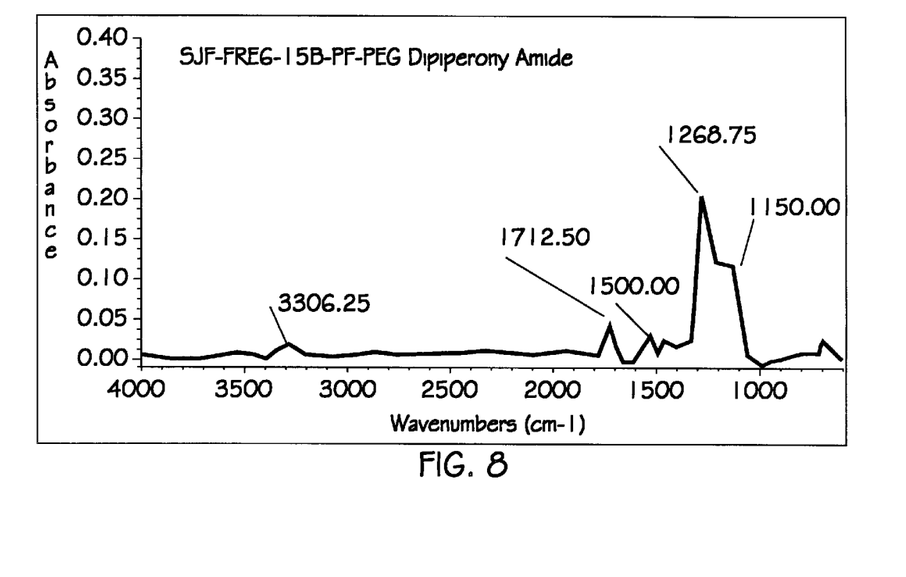
FIG. 8 is a FTIR plot for the lubricant product according to Example 2.

In a 20 ml scintillation vial were added 2.0 g (0.5 mm) of perfluoro polyethylene glycol diester and approximately 5 ml of HFE 7100. To the solution was added piperonyl amine (0.3 g~2.1 eq) the mixture turned cloudy and was set at room temperature for 6 days. At this time the mixture was poured over silica gel and the column eluted with HFE 7100 which yielded ~0.2 gram of material which was discarded. The column was then eluted with Freon TA to yield 1.8 g (~83%) of an oil. The FTIR spectra is shown in FIG. 8 and indicates that all the ester is gone, i.e. no carbonyl at ~1800 $cm^{-1}$, and an amide carbonyl at 1712 $cm^{-1}$.

Figure 9:
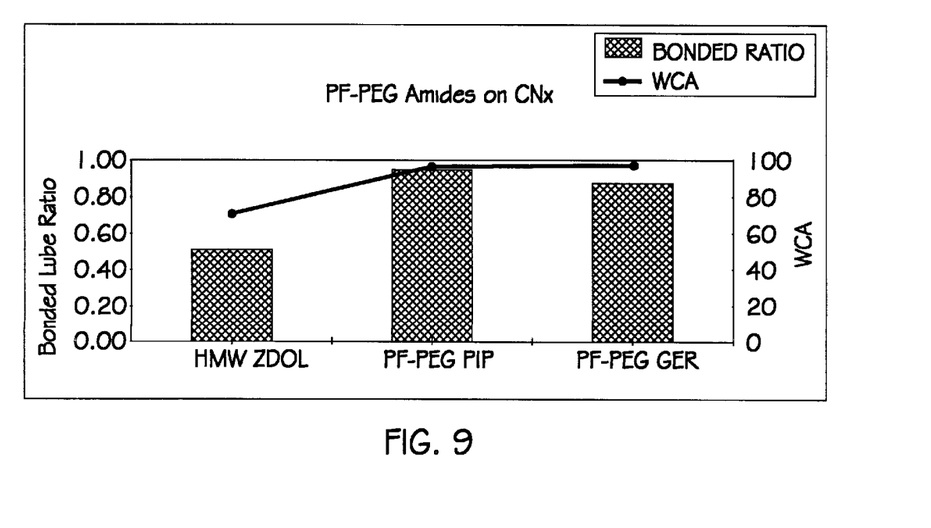
FIG. 9 depicts comparative water contact angle and bonded lube ratio data for discs tested containing lubricants according to two embodiments of the present invention and a convention lubricant.

FIG. 9 depicts comparative water contact angle and bonded lube ratio data for discs tested containing lubricants according to two embodiments of the present invention and a convention lubricant. The bonded lube ratio is a measure of how tightly the lubricant adheres to the magnetic recording media, which is a good indication of the lubricant's performance. The ratio is the amount of lubricant that is directly bonded to the media compared to the total amount of lubricant that was originally applied. As shown in FIG. 9, the bonded lube ratio of the two lubricant embodiments of the present invention (in this case perfluoro polyethylene glycol peperonyl amide and perfluoro polyethylene glycol gerinal amide) is significantly higher than the bonded lube ratio of a convention lubricant (in this case high molecular weight Zdol).

Another important characteristic of a lubricant is its water contact angle (WCA). A water contact angle shows the interaction, and hence the coverage, of the lubricant on the surface of the disc. As shown in FIG. 8, the lubricants of the present invention exhibit high water contact angle values which are greater than the convention lubricant.

It is evident from the above results and discussion that information storage systems having improved lubricants are provided. The lubricants comprising a fluoropolyether amide exhibit high bonded lube ratios and water contact angles, while providing low wear index and low stiction. The invention now being fully described, it will be apparent to one of ordinary skill in the art that many changes and modifications can be made thereto without departing from the spirit or scope of the appended claims. Only the preferred embodiment of the invention and but a few examples of its versatility are shown and descried in the present disclosure. It is to be understood that the invention is capable of use in various other combinations and environments and is capable of changes or modifications within the scope of the inventive concept as expressed herein.

I claim:

1. An information storage system comprising:

an information storage medium;

at least one read/write head comprising a transducer for information introduction and/or retrieval from said medium;

an actuator supporting said at least one read/write head for moving said transducer relative to said storage medium; and lubricating means for lubricating the surface of said storage medium, wherein said lubricating means includes a fluoropolyether amide having a formula of:

where:

R1 is selected from the group consisting of fluoroalkyls having two to ten carbon atoms and perfluoralkyls having two to ten carbon atoms;

R2 and R3 comprise at least two carbon atoms and are independently selected from the group consisting of alkyl, substituted alkyl, fluoroalkyl, perfluoroalkyl aryl, substituted aryl, fluoroaryl and perfluroaryl groups;

A is selected from the group of peperonyl amine, gerinal amine and oleyl amine;

x is in the range of approximately 5 to 500; and y and z are independently in the range of 0 to approximately 100.

2. The storage system of claim 1 wherein said fluoropolyether amide has the general formula of:

where:

R1 comprise at least two carbon atoms and are independently selected from the group consisting of alkyls, substituted alkyl, fluoroalkyl, perfluoroalkyl, aryl, substituted aryl, fluoroaryl and perfluroaryl groups; and A is selected from the group of peperonyl amine, gerinal amine and oleyl amine.

3. The storage system of claim 2 wherein R1 is selected from the group consisting of fluoroalkyls having two to ten carbon atoms, and perfluoralkyls having two to ten carbon atoms.

4. The storage system of claim 1 wherein said fluoropolyether amide is selected from the group of: perfluoro polyethylene glycol piperonyl amide, perfluoro polyethylene glycol gerinal amide, and perfluoro polyethylene glycol oleyl amide.

5. The storage system of claim 1 wherein the fluoropolyether amide has a molecular weight in the range of approximately 1000 to 10,000 AMU.

6. The storage system of claim 1 wherein the fluoropolyether amide has a molecular weight in the range of approximately 1500 to 5000 AMU.

7. The information storage system of claim 1 wherein said fluoropolyether amide is formed by a reaction of a fluoropolyether ester or diester and an amine, wherein said fluoropolyether ester has a formula of:

$$BO(R1O)_x(R2O)_y(R3O)_zB$$

where:
- R1 is selected from the group consisting of fluoroalkyls having two to ten carbon atoms and perfluoralkyls having two to ten carbon atoms;
- R2 and R3 comprise at least two carbon atoms and are independently selected from the group consisting of alkyl, substituted alkyl, fluoroalkyl, perfluoroalkyl, aryl, substituted aryl, fluoroaryl and perfluroaryl groups;
- x is in the range of approximately 5 to 500;
- y and z are independently in the range of 0 to approximately 100;
- B is $CF_2COOCH_3$; and
- said amine is selected from the group of peperonyl amine, gerinal amine and oleyl amine.

8. The storage system of claim 1 wherein said fluoropolyether amide is carried in a solvent solution at a concentration in the range of approximately 0.01 to 1.0 weight percent amide.

9. A disc for use in an information storage system characterized in that a lubricant including a fluoropolyether amide is disposed on the surface of said disc wherein said lubricant has the chemical formula of:

$$AO(R1O)_x(R2O)_y(R3O)_zA$$

where:
- R1 is selected from the group consisting of fluoroalkyls having two to ten carbon atoms and perfluoralkyls having two to ten carbon atoms;
- R2 and R3 comprise at least two carbon atoms and are independently selected from the group consisting of alkyl, substituted alkyl, fluoroalkyl, perfluoroalkyl, aryl, substituted aryl, fluoroaryl and perfluroaryl groups;
- A is selected from the group of peperonyl amine, gerinal amine and oleyl amine;
- x is in the range of approximately 5 to 500; and
- y and z are independently in the range of 0 to approximately 100.

10. The disc of claim 9 wherein said fluoropolyether amide includes a fluoro polyalkylene glycol amide having the general formula of:

$$A-CF_2(OR1)_n\,OCF_2A$$

where:
- R1 comprise at least two carbon atoms and are independently selected from the group consisting of alkyl having two to ten carbon atoms, substituted alkyl, fluoroalkyl, perfluoroalkyl, aryl, substituted aryl, fluoroaryl and perfluroaryl groups; and
- A is selected from the group of peperonyl amine, gerinal amine and oleyl amine.

11. The disc of claim 9 wherein said fluoropolyether amide is selected from the group of: perfluoro polyethylene glycol piperonyl amide, perfluoro polyethylene glycol gerinal amide, and perfluoro polyethylene glycol oleyl amide.

12. The disc of claim 9 wherein the fluoropolyether amide has a molecular weight in the range of approximately 1000 to 10,000 AMU.

* * * * *